United States Patent
Xue et al.

(10) Patent No.: US 10,461,320 B1
(45) Date of Patent: Oct. 29, 2019

(54) FORMATION OF SILICON-CARBIDE REINFORCED CARBON-SILICON COMPOSITES

(71) Applicant: Nanostar Inc., New Orleans, LA (US)

(72) Inventors: Leigang Xue, Metairie, LA (US); Byoung Chul You, Metaririe, LA (US); Meysam Shahami, New Orleans, LA (US); Shiva Adireddy, New Orleans, LA (US); Jonathan Goodman, Evanston, IL (US); Alexander L. Girau, Metairie, LA (US)

(73) Assignee: Nanostar, Inc., New Orleans, LA (US)

( * ) Notice: Subject to any disclaimer, the term of this patent is extended or adjusted under 35 U.S.C. 154(b) by 0 days.

(21) Appl. No.: 16/415,298

(22) Filed: May 17, 2019

Related U.S. Application Data

(60) Provisional application No. 62/846,807, filed on May 13, 2019.

(51) Int. Cl.
| | | |
|---|---|---|
| *H01B 1/04* | (2006.01) | |
| *H01M 4/00* | (2006.01) | |
| *H01M 4/36* | (2006.01) | |
| *H01M 10/0525* | (2010.01) | |
| *H01M 4/587* | (2010.01) | |
| *H01M 4/38* | (2006.01) | |
| *H01M 4/02* | (2006.01) | |

(52) U.S. Cl.
CPC .............. *H01M 4/364* (2013.01); *H01B 1/04* (2013.01); *H01M 4/386* (2013.01); *H01M 4/587* (2013.01); *H01M 10/0525* (2013.01); *H01M 2004/027* (2013.01)

(58) Field of Classification Search
CPC .. H01B 1/00; H01B 1/04; H01B 1/24; H01M 4/58; H01M 4/362; H01M 4/583; H01M 4/625; C01B 32/15; C01B 32/956
See application file for complete search history.

(56) References Cited

U.S. PATENT DOCUMENTS

| | | | | |
|---|---|---|---|---|
| 4,154,787 | A * | 5/1979 | Brown | C04B 35/573 264/101 |
| 4,515,860 | A * | 5/1985 | Holzl | C04B 41/009 427/249.15 |
| 5,326,732 | A * | 7/1994 | Ogawa | C04B 35/528 264/682 |
| 7,776,473 | B2 | 8/2010 | Aramata et al. | |
| 7,906,238 | B2 | 3/2011 | Le et al. | |
| 8,071,238 | B2 | 12/2011 | Le et al. | |
| 9,178,208 | B2 * | 11/2015 | Park | B82Y 30/00 |
| 9,190,186 | B2 * | 11/2015 | Sugiyama | H01M 4/364 |
| 9,397,338 | B2 | 7/2016 | Park et al. | |
| 9,553,303 | B2 | 1/2017 | Park et al. | |
| 9,583,757 | B2 | 2/2017 | Park et al. | |

(Continued)

OTHER PUBLICATIONS

Bi, Y. et al. "In-situ catalytic preparation and characterization of SiC nanofiber coated graphite flake with improved water-wettability" Ceramics International 43 (2017) 15755-15761.

(Continued)

*Primary Examiner* — Mark Kopec

(57) ABSTRACT

Silicon anode compositions are provided which include embedded silicon carbide nanofibers. Methods of production and use are further described.

13 Claims, 11 Drawing Sheets

(56) References Cited

U.S. PATENT DOCUMENTS

| | | | |
|---|---|---|---|
| 9,806,328 B2 | 10/2017 | Park et al. | |
| 9,941,509 B2 | 4/2018 | Park et al. | |
| 9,997,765 B2 | 6/2018 | Park et al. | |
| 10,103,378 B2 | 10/2018 | Park et al. | |
| 10,211,454 B2 | 2/2019 | Newbound et al. | |
| 2013/0344391 A1 | 12/2013 | Yushin et al. | |
| 2014/0255785 A1* | 9/2014 | Do | C09D 1/00 429/231.8 |
| 2014/0264201 A1* | 9/2014 | Bouvy | B82Y 30/00 252/587 |
| 2015/0295227 A1* | 10/2015 | Zhao | H01M 4/134 429/303 |
| 2015/0318571 A1 | 11/2015 | Baba et al. | |
| 2015/0325848 A1* | 11/2015 | Yamashita | H01M 4/587 429/231.4 |
| 2018/0175390 A1 | 6/2018 | Sun et al. | |

OTHER PUBLICATIONS

Dai, J. et al. "Synthesis and growth mechanism of SiC nanofibers on carbon fabrics" CrystEngComm 2017.

Jiang, H. et al. "The pyrolysis mechanism of phenol formaldehyde resin" Polymer Degradation and Stability 97 (2012) 1527-1533.

Ritts, A.C.; Li, H.; Yu, Q. "Large Scale Synthesis of SiC Nanofibers from Various Carbon Precursors" NSTI-Nanotech, 2008, 612-615.

Sun, X.; Shao, C.; Zhang, F.; Li, Y.; Wu, Q.; Yang, Y. "SiC Nanofibers as Long-Life Lithium-Ion Battery Anode Materials" Frontiers in Chem. 2018, 6, 166.

Vertruyen, B. et al. "Spray-drying of electrode materials for lithium and sodium-ion batteries" Materials 2018, 11, 1076.

Xu, Q. et al. "Nano/Micro-Structured Si/C Anodes with High Initial Coulombic Efficiency in Li-Ion Batteries" Chem. Asian J. 2016, 11, 1205-1209.

Xu, Q. et al. "Stable Sodium Storage of Red Phosphorus Anode Enabled by a Dual-Protection Strategy" ACS Appl. Mater. Interfaces 2018, 10, 30479-30486.

Zhang, H.L. et al. "Urchin-like nano/micro hybrid anode materials for lithium ion battery" Carbon 44 (2006) 2778-2784.

Zhang, M. et. al. "Interweaved Si@C/CNTs&CNFs composites as anode materials for Li-ion batteries" J. Alloys and Compounds 2014, 588, 206-211.

Zhou, J.Y. et al. "Terbium-Catalyzed Selective Area Growth of SiC Nanorods: Synthesis, Optimal Growth, and Field Emission Properties" J. Am. Ceram. Soc., 93 [2] 488-493 (2010).

Zhou, W.; Long, L.; Xiao, P.; Li, Y.; Luo, H.; Hu, W.; Yin, R. "Silicon carbide nano-fibers in-situ grown on carbon fibers for enhanced microwave absorption properties" Ceramics Intern. 2017, 43, 5628-5634.

* cited by examiner

FORMATION OF SILICON-CARBIDE REINFORCED CARBON-SILICON COMPOSITES

CROSS-REFERENCE TO RELATED APPLICATIONS

This disclosure claims the benefit of priority to U.S. Provisional Patent Application No. 62/846,807, filed 13 May 2019, the entirety of which is incorporated herein.

FIELD OF THE INVENTION

This invention is related to the products and preparations of silicon nanocrystal materials for use in lithium-ion batteries.

BACKGROUND

Lithium-ion ($Li^+$) secondary or rechargeable batteries are now the most widely used secondary battery systems for portable electronic devices. However, the growth in power and energy densities for lithium ion battery technology has stagnated in recent years as materials that exhibit both high capacities and safe, stable cycling have been slow to be developed. Much of the current research effort for the next generation of higher energy capacity materials has revolved around using small or nanoparticulate active material bound together with conductive agents and carbonaceous binders.

There is a current and growing need for higher power and energy density battery systems. The power requirements for small scale devices such as microelectromechanical systems (MEMS), small dimensional sensor systems, and integrated on-chip microelectronics exceed the power densities of current Li+ based energy storage systems. Power densities of at least 1 $J/mm^2$ are desired for effective function for such systems, and current energy densities for $Li^+$ thin film battery systems are about 0.02 $J/mm^2$. Three dimensional architectures for battery design can improve the areal power density of $Li^+$ secondary batteries by packing more active material per unit area without employing thicker films that are subject to excessive cycling fatigue. Three-dimensional Lithium-ion battery architectures also increase lithium ion diffusion by maximizing the surface area to volume ratio and by reducing diffusion lengths.

The current state-of-the-art for anode electrodes in lithium ion batteries includes the use of high surface area carbon materials. However, the capacity of any graphitic carbon, carbon black, or other carbonaceous material is limited to a theoretical maximum of 372 mAh/g and about 300 mAh/g in practice because carbon electrodes are usually formed of carbon particles mixed with a polymeric binder pressed together to form a bulk electrode. To store charge, $Li^+$ intercalates between the planes of $sp^2$ carbon atoms and this C—$Li^+$—C moiety is reduced. In addition, the maximum number of $Li^+$ that can be stored is one per every six carbon atoms ($LiC_6$). While the capacity of graphitic carbon is not terribly high, the intercalation process preserves the crystal structure of the graphitic carbon, and so cycle life can be very good.

A more recent and promising option for anode materials is silicon (Si). In contrast to the intercalative charge storage observed in graphite, Si forms an alloy with lithium. Silicon-based negative electrodes are attractive because their high theoretical specific capacity of about 4200 mAh/g, which far exceeds than that of carbon, and is second only to pure Li metal. This high capacity comes from the conversion of the Si electrode to a lithium silicide which at its maximum capacity has a formula of $Li_{22}Si_6$, storing over 25 times more Li per atom than carbon. The large influx of atoms upon alloying, however, causes volumetric expansion of the Si electrode by over 400%. This expansion causes strain in the electrode, and this strain is released by formation of fractures and eventual electrode failure. Repeated cycling between $Li_xSi_y$ and Si thus causes crumbling of the electrode and loss of interconnectivity of the material. For example, 1 μm thick Si film anodes have displayed short cyclability windows, with a precipitously capacity drop after only 20 cycles.

This strain from volumetric expansion has been mitigated, to some extent, by nanostructuring the anode material, providing room for material expansion. While nanostructuring Si materials for $Li^+$ charge storage has demonstrated improved cycling lifetimes, larger specific capacities, and higher sustainable charge rates compared to unstructured systems of the same materials, theoretically, because nanoscale materials have free space to accommodate volume expansion, these nanostructured Si materials continue to fail to perform sufficient to be incorporated into commercial batteries. Accordingly, there is a need to develop nanostrcutred Si materials with improved discharge capacities and lifespan characteristics.

SUMMARY

A first embodiment is a process of preparing a material for use in an anode of a lithium ion battery, this process includes thermalizing an admixture of a plurality of silicon nanocrystals, a carbon matrix precursor, and a catalyst or catalyst precursor.

A second embodiment is a process of preparing a material for use in an anode of a lithium ion battery, this process includes thermalizing an admixture of a plurality of silicon oxide nanoparticles, a carbon matrix precursor, and a catalyst or catalyst precursor under a reducing atmosphere at a temperature of about 600° C. to about 1200° C.; thereby forming a plurality of particulates comprising a silicon-carbide reinforced carbon matrix carrying a plurality of silicon nanocrystals.

A third embodiment is a process of preparing a material for use in an anode of a lithium ion battery, this process includes thermalizing an admixture of a plurality of silicon nanocrystals, a carbon matrix precursor, and a plurality of silicon carbide fibers; thereby forming a plurality of particulates comprising a silicon-carbide reinforced carbon matrix carrying a plurality of silicon nanocrystals.

BRIEF DESCRIPTION OF THE FIGURES

For a more complete understanding of the disclosure, reference should be made to the following detailed description and accompanying drawing figures wherein.

Figure 1:
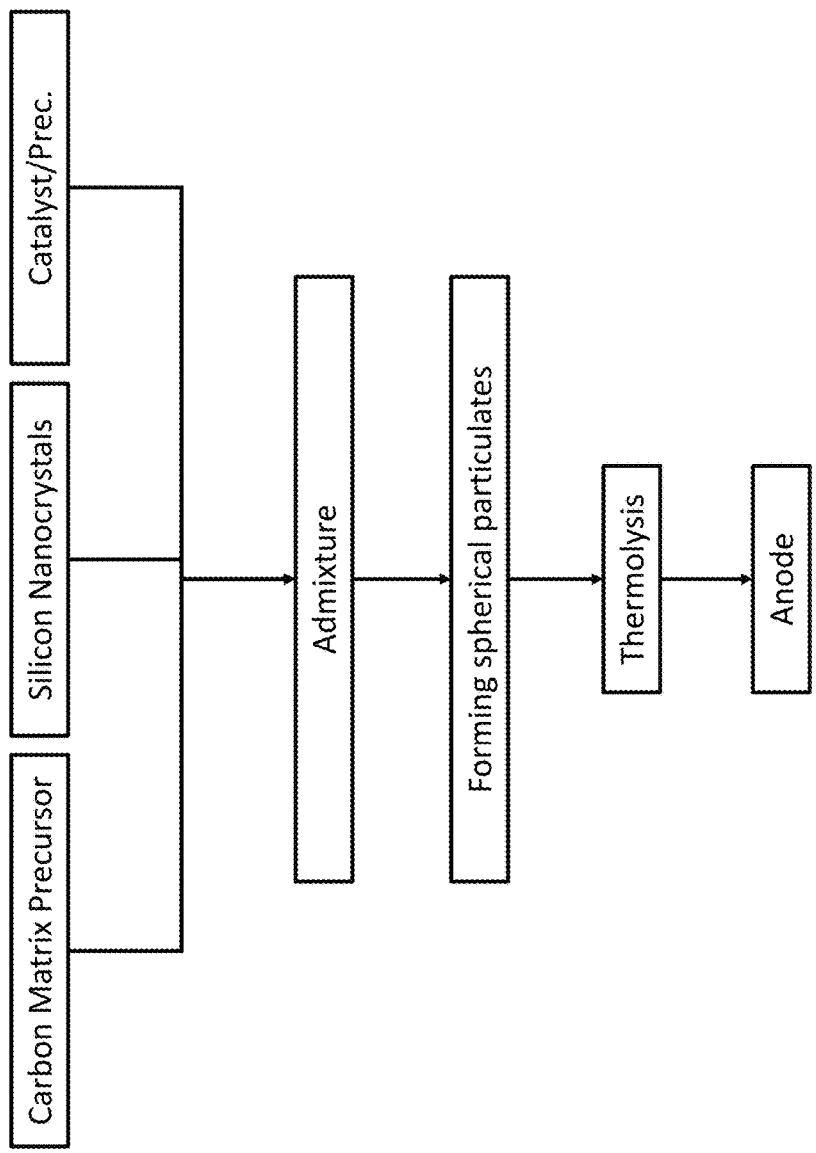
FIG. 1 is a General Process flow diagram of the preparation of the materials described herein.
Figure 2:
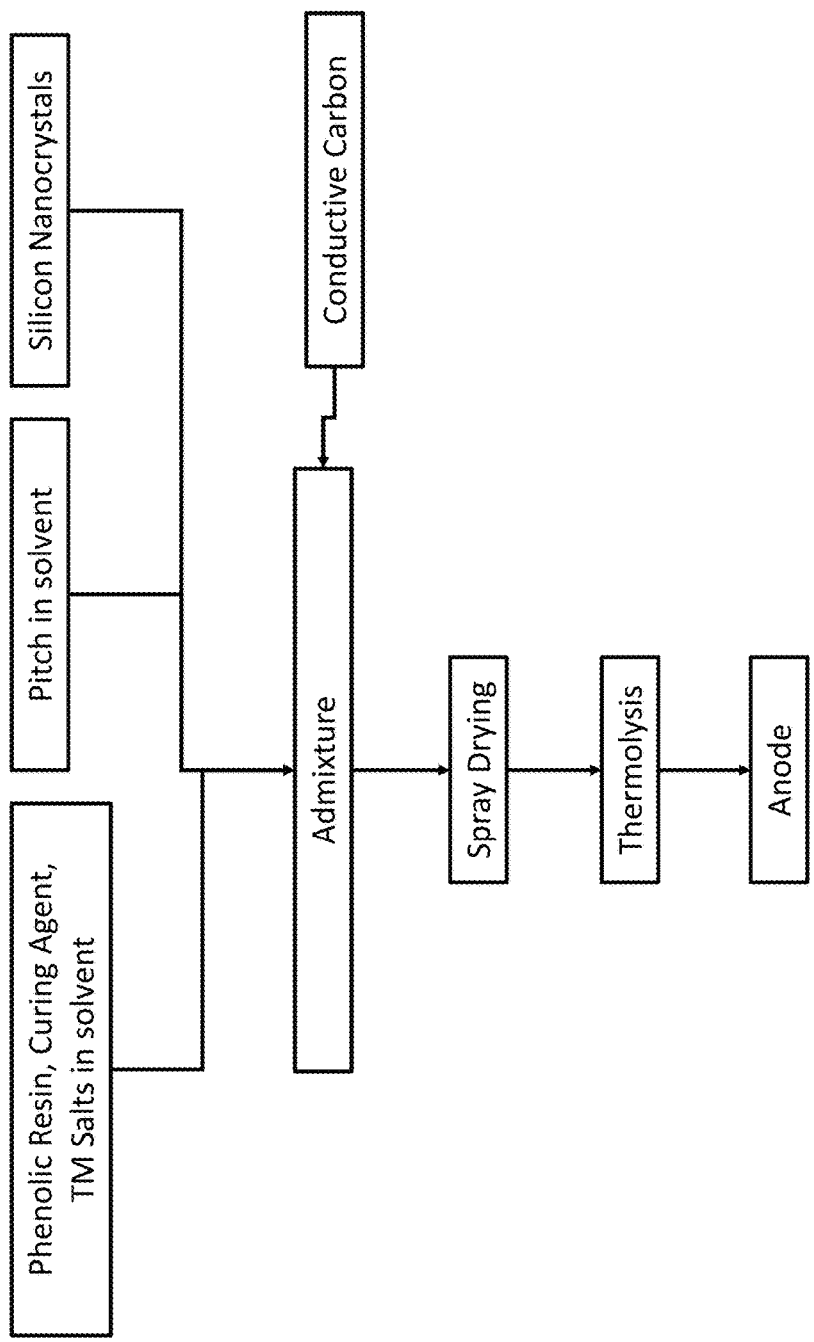
FIG. 2 is a process flow diagram for the preparation of materials represented in the Examples.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

Herein are described products, processes, and anodes that feature silicon nanocrystals for use in lithium-ion batteries. The products that feature silicon nanocrystals for use in lithium-ion batteries, preferably, include a carbon matrix carrying a plurality of silicon nanocrystals and a plurality of SiC nanofibers. The particulate, preferably a plurality of particulates, can have a diameter in the range of about 50 nm to about 100 µm, about 100 nm to about 50 µm, about 100 nm to about 25 µm, about 150 nm to about 25 µm, about 200 nm to about 25 µm, about 250 nm to about 25 µm, about 300 nm to about 25 µm, about 350 nm to about 25 µm, about 400 nm to about 25 µm, about 450 nm to about 25 µm, about 500 nm to about 25 µm, about 500 nm to about 20 µm, about 500 nm to about 15 µm, about 500 nm to about 10 µm, or about 500 nm to about 5 µm and a composition that includes a carbon matrix carrying a plurality of silicon nanocrystals and a plurality of SiC nanofibers. That is, each particulate is, preferably, a composite mixture of the silicon nanocrystals and SiC nanofibers in a carbon matrix. Preferably, the silicon nanocrystal and the SiC nanofibers are interspersed in the carbon matrix.

Each particulate has a surface and an interior volume. Preferably, the interior volume includes the silicon nanoparticles and SiC nanofibers carried within and interspersed in the carbon matrix. In one instance, the SiC nanofibers are entirely within the interior volume. That is, the SiC nanofibers are entirely within the interior volume when they do not extend outwardly from the surface of the particulate. Notably, the surface of the particulate can include the SiC nanofibers. In another instance, the SiC nanofibers are within the interior volume and extend outwardly from the surface of the particulate. In one example, the SiC nanofibers are embedded in the particulate and extend outwardly from the particulate. Preferably, the material is free of non-embedded SiC nanofibers, that is, the material is preferably free of loose or free SiC nanofibers.

Herein, SiC nanofibers refer to SiC materials having length, width, and heights that are between about 5 nm and about 10,000 nm, preferably between about 5 nm and about 5,000 nm, or between about 5 nm and about 1,000 nm. More preferably, the SiC nanofibers are fibrous; that is, the length of the nanofibers are longer than the width and height. In one instance, the SiC nanofibers have a length to width ratio of at least 5, at least 10, at least 15, at least 20, at least 25, at least 30, at least 35, at least 40, at least 45, at least 50, at least 75, at least 100, at least 125, at least 150, at least 175, or at least 200.

In some examples, the SiC nanofibers extend outwardly from the particulate and are at least partially embedded in the particulate. The external SiC nanofiber segments, those segments that extend from the particulate, can have lengths from about 1 nm to about 1,000 nm, about 1 nm to about 500 nm, about 1 nm to about 400 nm, about 1 nm to about 300 nm, about 1 nm to about 250 nm, about 1 nm to about 200 nm, about 1 nm to about 150 nm, or about 1 nm to about 100 nm.

The SiC nanofibers, preferably, have crystalline SiC domains extending along the length of the nanofiber. In one instance, the SiC nanofibers carry an amorphous surface layer. In one instance, the surface layer is amorphous $SiO_x$ (e.g., wherein x is a value from 1 to 2). In another instance, the surface layer is amorphous carbon. In still another instance, the amorphous layer includes two layers wherein one layer can be $SiO_x$ and the other carbon. In yet another instance, the amorphous layer can include a silicon oxycarbide ($SiO_xC_y$) layer.

The particulate has a composition that includes silicon metal, silicon carbide, and carbon (e.g., as represented in the carbon matrix). Regarding silicon metal, the particulate can include about 1 wt. % to about 75 wt. % silicon metal, about 1 wt. % to about 50 wt. % silicon metal, preferably about 5 wt. % to about 40 wt. % silicon metal, about 10 wt. % to about 35 wt. % silicon metal, or about 15 wt. % to about 30 wt. % silicon metal. Regarding silicon carbide, the particulate can include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide. Regarding carbon, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon. In one example, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon and further include about 1 wt. % to about 50 wt. % silicon metal, preferably about 5 wt. % to about 40 wt. % silicon metal, about 10 wt. % to about 35 wt. % silicon metal, or about 15 wt. % to about 30 wt. % silicon metal. This example can still further include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide. In another example, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon and further include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide. In still yet another example, the particulate can include about 1 wt. % to about 50 wt. % silicon metal, preferably about 5 wt. % to about 40 wt. % silicon metal, about 10 wt. % to about 35 wt. % silicon metal, or about 15 wt. % to about 30 wt. % silicon metal and further include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide.

In one preferable instance, the particulate can include silicon metal (i.e., silicon nanocrystals), silicon carbide, and carbon (e.g., as represented in the carbon matrix). In another instance, the particulate can consist essentially of silicon metal (i.e., silicon nanocrystals), silicon carbide, and carbon (e.g., as represented in the carbon matrix). As used herein, the particulate preferably includes less than 5 wt. %, less than 4 wt. %, less than 3 wt. %, less than 2 wt. %, or less than 1 wt. % of materials other than silicon metal, silicon carbide, and carbon. In still another instance, the particulate can include silicon metal, silicon carbide, carbon, and a catalyst or the remnants of a catalyst. Preferably, the catalyst or remnants of the catalyst do not compose more than 10 wt. %, more than 7.5 wt. %, or 5 wt. % of the particulate.

Another product is a material that includes a plurality of particulates, preferably, having a diameter in the range of about 50 nm to about 50 μm, and comprising a silicon-carbide reinforced carbon matrix carrying a plurality of silicon nanocrystals. In one example, the particulates consist essentially of the silicon-carbide reinforced carbon matrix carrying the plurality of silicon nanocrystals. In another example, the particulates are spherical. In still another example, the silicon nanocrystals include greater than about 70 wt. % silicon metal; preferably greater than about 95 wt. % silicon metal. In yet another example, the silicon nanocrystals include a silicon alloy.

The silicon-carbide reinforced carbon matrix preferably includes a carbon-constituent material and SiC nanofibers. As used herein a carbon-constituent material is a carbon-based material that binds/holds the SiC nanofibers and, preferably, is composed of at least 50 wt. %, 60 wt. %, 70 wt. %, 80 wt. %, 90 wt. %, 95 wt. %, or 99 wt. % carbon. In one instance, the carbon-constituent material consists essentially of carbon. In another instance, the carbon-constituent material is the thermolysis product of a carbon matrix precursor, as described below.

In one example, the silicon-carbide reinforced carbon matrix includes SiC nanofibers carried within the carbon-constituent material and includes SiC nanofibers extending from a surface of the carbon-constituent material. In another example, the silicon-carbide reinforced carbon matrix includes interior SiC nanofiber segments and exterior SiC nanofiber segments, the interior SiC nanofiber segments are carried within the carbon-constituent material; the exterior SiC nanofiber segments extend from a surface of the carbon-constituent material. Exterior SiC nanofiber segments can be easily observed in FIGS. 3 and 4. A smaller percentage of SiC nanofibers can be observed in the expanded view of FIG. 7.

In a preferable instance, the material that includes the particulates of silicon-carbide reinforced carbon matrix carrying a plurality of silicon nanocrystals, further includes a binder. More preferably, the material includes a silicon-carbide reinforced binder which includes the exterior SiC nanofiber segments admixed with the binder.

The materials can be prepared by a process that, preferably, includes thermalizing an admixture of a plurality of silicon nanocrystals, a carbon matrix precursor, and a catalyst or catalyst precursor. In one preferable instance, thermalizing the admixture includes forming SiC nanofibers. In another preferable instance, thermalizing the admixture includes forming particulates that comprise a silicon-carbide reinforced carbon matrix carrying a plurality of silicon nanocrystals. Furthermore, the silicon-carbide reinforced carbon matrix, preferably, includes a carbon-constituent material and SiC nanofibers; includes SiC nanofibers carried within the carbon-constituent material; and includes SiC nanofibers extending from a surface of the carbon-constituent material.

The admixture, prior to thermalizing, can include a mass ratio of the silicon nanocrystals to the carbon matrix precursor of about 10:1 to about 1:10, about 10:1 to about 1:5, about 5:1 to about 1:5, about 4:1 to about 1:4, about 3:1 to about 1:3, or about 2.5:1 to about 1:2.5, alternatively the admixture can include a mass ratio of the silicon nanocrystals to the carbon matrix precursor of about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. Alternatively, the admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the silicon nanocrystals; can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the carbon matrix precursor; and can include about 0.01 wt. %, 0.02 wt. %, 0.025 wt. %, 0.03 wt. %, 0.035 wt. %, 0.040 wt. %, 0.045 wt. %, 0.050 wt. %, 0.055 wt. %, 0.060 wt. %, 0.065 wt. %, 0.070 wt. %, 0.075 wt. %, 0.080 wt. %, 0.085 wt. %, 0.090 wt. %, 0.095 wt. %, 0.1 wt. %, 0.2 wt. %, 0.25 wt. %, 0.3 wt. %, 0.35 wt. %, 0.40 wt. %, 0.45 wt. %, 0.50 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. % of the catalyst or catalyst precursor.

Herein, silicon nanocrystals preferably have mean diameter of less than about 1,000 nm, 500 nm, 400 nm, 350 nm, 300 nm, 250 nm, 200 nm, 150 nm, 100 nm, 75 nm, or 50 nm, and greater than about 1 nm, 5 nm, 10 nm, 15 nm, 20 nm, 25 nm, 30 nm, 35 nm, 40 nm, 45 nm, or 50 nm. Preferably, the silicon nanocrystals have a $D_{90}$ of about 1,000 nm, 500 nm, 400 nm, 350 nm, 300 nm, 250 nm, 200 nm, 150 nm, 100 nm, 75 nm, or 50 nm; more preferably a $D_{50}$ of about 1,000 nm, 500 nm, 400 nm, 350 nm, 300 nm, 250 nm, 200 nm, 150 nm, 100 nm, 75 nm, or 50 nm. In one instance, the silicon nanocrystals are spherical. In another instance, the silicon nanocrystals have a plate-like morphology. The silicon nanocrystals are preferably composed of silicon metal or a silicon alloy. In one example, the silicon metal is analytically pure silicon, for example, single crystal silicon used in the semiconductor/computer industry. In another example, the silicon metal is recycle or scrap from the semiconductor or solar industries. In still another example, the silicon metal is a silicon alloy. A silicon alloy can be a binary alloy (silicon plus one alloying element), can be a tertiary alloy, or can include a plurality of alloying elements. The silicon alloy is understood to be a majority silicon. A majority silicon particle means that the metal has a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon; these can include silicon alloys that comprise silicon and at least one alloying element. The alloying element can be, for example, an alkali metal, an alkaline-earth metal, a Group 13 to 16 element, a transition element, a rare earth element, or a combination thereof, but not Si. The alloying element can be, e.g., Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the silicon alloy can be selected from SiTiNi, SiAlMn, SiAlFe, SiFeCu, SiCuMn, SiMgAl, SiMgCu, or a combination thereof.

In another example, the silicon nanocrystals are polycrystalline silicon nanocrystals. As used herein, a polycrystalline silicon nanocrystal is a discrete silicon nanocrystal that has more than one crystal domain. The domains can be of the same crystal structure and display discontinuous domains, or the domains can be of different crystal structures. In one example, the domains are all diamond-cubic silicon (e.g., having a lattice constant of 5.431 Å). In another example, the domains include a diamond-cubic silicon and a diamond-hexagonal silicon. In still another example, the domains include a diamond-cubic silicon and amorphous silicon. In yet still another example, the domains include a diamond-cubic silicon, a diamond-hexagonal silicon, and amorphous silicon. In one preferred instance, the silicon metal has a substantial portion that exists in a diamond-cubic crystal structure. Preferably, at least 10 atom %, 20 atom %, 25 atom %, 30 atom %, 35 atom %, 40 atom %, 45 atom %, 50 atom %, 55 atom %, 60 atom %, 65 atom %, 70 atom %, 75 atom %, 80 atom %, 85 atom %, 90 atom %, or 95 atom % of the silicon metal has a diamond-cubic crystal structure. Notably, the silicon metal can be single crystalline or can be polycrystalline. Additionally, the silicon metal can include alloying elements as long as the crystal structure maintains a substantial portion of diamond-cubic structure.

In still another example, the silicon nanocrystals are coated silicon nanocrystals wherein the silicon carries an organic or carbon-based coating. In one instance, the organic coating includes an alkyl or alkynyl functionality bound to a surface of the silicon nanocrystal through a Si—C covalent bond. In another instance, the carbon-based coating includes a graphitic layer (e.g., including 1, 2, 3, 4, 5, 6, 7, 8, 9, or 10 graphene sheets) carried on a surface of the silicon nanocrystal. Preferably, in instances wherein the silicon nanocrystal carries an organic or carbon-based coating, the coated silicon nanocrystal includes more than about 50 wt. %, 55 wt. %, 60 wt. %, 65 wt. %, 70 wt. %, 75 wt. %, 80 wt. %, 85 wt. %, 90 wt. %, or 95 wt. % silicon (e.g., silicon metal or silicon alloy) and more than 0.1 wt. % and less than 50 wt. %, 45 wt. %, 40 wt. %, 35 wt. %, 30 wt. %, 25 wt. %, 20 wt. %, 15 wt. %, 10 wt. %, or 5 wt. % of the organic or carbon-based coating.

In still yet another example, the silicon nanocrystals carry an oxide layer (e.g., a silicon oxide layer). Preferably, the silicon oxide layer has a thickness of less than 10 nm, 9 nm, 8 nm, 7 nm, 6 nm, 5 nm, 4 nm, 3 nm, 2 nm, or 1 nm. In one instance, the oxide layer is a native oxide, in another instance, the oxide layer is a thermal oxidation product.

Herein, a carbon matrix precursor is an organic compound that can be thermally processed to provide a carbon matrix. Examples of carbon matrix precursors include phenolic resin, pitch, polyacrylonitrile, poly(furfuryl alcohol), and mixtures thereof. Preferably, the carbon matrix precursor is solid at room temperature and pressure, more preferably, the carbon matrix precursor has a melting and/or softening point that is greater than 100° C., 150° C., 200° C., 250° C., or 300° C.

Other examples include, coal tar pitch from soft pitch to hard pitch; coal-derived heavy oil such as dry-distilled liquefaction oil; petroleum-based heavy oils including directly distilled heavy oils such as atmospheric residue and vacuum residue, crude oil, and decomposed heavy oil such as ethylene tar produced during a thermal decomposition process of naphtha and so on; aromatic hydrocarbons such as acenaphthylene, decacyclene, anthracene and phenanthrene; polyphenylenes such as phenazine, biphenyl and terphenyl; polyvinyl chloride; water-soluble polymers such as polyvinyl alcohol, polyvinyl butyral and polyethylene glycol and insolubilized products thereof; nitrogen-containing polyacrylonitriles; organic polymers such as polypyrrole; organic polymers such as sulfur-containing polythiophene and polystyrene; natural polymers such as saccharides, e.g. glucose, fructose, lactose, maltose and sucrose; thermoplastic resins such as polyphenylene sulfide and polyphenylene oxide; and thermosetting resins such as phenol-formaldehyde resin and imide resin.

The catalyst or catalyst precursor can include nickel, copper, iron, zinc, or a mixture thereof. In one instance, the catalyst or catalyst precursor includes nickel, copper, or a mixture thereof. Preferably, the catalyst or catalyst precursor includes nickel. In one particular instance, the catalyst or catalyst precursor is nickel metal or nickel oxide. In another instance, the catalyst precursor is a nickel salt. In one example, the nickel salt can be selected from, for example, nickel acetate, nickel nitrate, nickel chloride, nickel carbonate, nickel perchlorate, or combinations thereof. In one preferred example, the nickel salt includes a nickel nitrate or a combination therewith. Herewith, the terms catalyst and catalyst precursor refer to identifiable compounds or combinations that under reaction conditions provide catalytic sites for reactions. Notably, many identified materials are actually catalyst precursors and the compounds or materials that provide the catalytic sites are unable to be determined. In one specific example, the admixture includes the catalyst precursor; and wherein the process includes reducing the catalyst precursor to a catalyst. Therein, the process can include reducing the catalyst precursor to a catalyst; and then thermalizing the admixture of the plurality of silicon nanocrystals, the carbon matrix precursor, and the catalyst.

In another preferably instance, the admixture includes a plurality of spherical particulates each including silicon nanocrystals, carbon matrix precursor, and catalyst or catalyst precursor. Therewith, the process can further include a step of forming the plurality of spherical particulates by a biphasic technique. In one example, the biphasic technique can be spray drying, emulsification, and/or precipitation. In a preferred example, the biphasic technique is spray drying. In another instance, the admixture can have any shape or size while including silicon nanocrystals, carbon matrix precursor, and catalyst or catalyst precursor. In one instance, this admixture can be a homogeneous solid mass or dispersion. In one example, this mass can be crumbled or triturated prior to the thermalizing step; in another example, the mass can be triturated after thermalizing.

Herein, thermalizing the admixture means increasing a temperature about the admixture, preferably increasing the temperature of the admixture, to about 600° C. to about 1200° C. for about 0.5 to about 5 hours; preferably to a temperature of about 750° C. to about 1100° C., or about 850° C. to about 1000° C. In one example, the admixture is thermalized under a non-oxidizing atmosphere. In another example, the admixture is thermalized under an inert atmosphere; preferably wherein the inert atmosphere includes argon (Ar). In still another example, the admixture is thermalized under a reducing atmosphere; preferably wherein the reducing atmosphere includes hydrogen ($H_2$) and/or an admixture of carbon monoxide (CO) and carbon dioxide ($CO_2$). The reducing atmosphere can further include an inert carrier gas, e.g., nitrogen or argon, preferably, wherein the inert carrier gas is argon. One particularly preferable atmosphere includes carbon monoxide (CO) and carbon dioxide ($CO_2$). Other preferable atmospheres are forming gas (5% $H_2/N_2$), $H_2/Ar$, $H_2/CH_4/N_2$, $H_2/CH_4/Ar$, mixtures thereof, or mixtures thereof with CO and/or $CO_2$.

The admixture can further include a graphitic material. Preferably, the graphitic material can be selected from submiconized graphite, micronized graphite, carbon nanotubes, graphene, graphene oxide, and mixtures thereof. In one instance, the graphitic material is submiconized graphite; in another instance, micronized graphite; in still another instance, carbon nanotubes; in yet another instance, graphene; in still yet another instance, graphene oxide; in yet another instance, the graphitic material can be a mixture thereof. In another preferably instance, the catalyst or catalyst precursor is carried on the graphitic material as a catalyst impregnated graphitic material; Therein the admixture includes the plurality of silicon nanocrystals, the carbon matrix precursor, and the catalyst impregnated graphitic material. The admixture can include about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 20 wt. %, 25 wt. %, 30 wt. %, 35 wt. %, 40 wt. %, 45 wt. %, or 50 wt. % of the graphitic material.

In still another instance, the admixture further includes silicon oxide. Preferably, the admixture includes nanoparticles of silicon oxide. In one example, the silicon oxide is amorphous, in another example the silicon oxide is crystalline, in still another example the silicon oxide is polycrystalline. In one particularly preferably example, the admixture includes silicon nanocrystals and silicon oxide nanoparticles; more preferably wherein the silicon nanocrystals have a D50 greater than a D50 of the silicon oxide nanoparticles. In another example, the admixture can include about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 20 wt. %, 25 wt. %, 30 wt. %, 35 wt. %, 40 wt. %, 45 wt. %, or 50 wt. % of the silicon oxide. In another example, the admixture includes a ratio of silicon to silicon oxide of about 10:1, 9:1, 8:1, 7:1, 6:1, 5:1, 4:1, 3:1, 2:1, 1:1, or 1:2.

Alternatively, the admixture can be substantially free of silicon oxides. That is, the admixture can include less than about 1 wt. % silicon oxides, less than about 0.5 wt. % silicon oxides, less than about 0.25 wt. % silicon oxides, less than about 0.1 wt. % silicon oxides, less than about 0.05 wt. % silicon oxides, or less than about 0.01 wt. % silicon oxides; preferably, wherein the admixture is free of silicon oxides as determined by FTIR. Therein, the admixture can further include an oxy-graphitic material; wherein the oxy-graphitic material includes a graphitic material carrying aldehyde and carboxylate groups on the edges of graphic sheets or tubes.

The admixture can further include additives, carriers, solvents, and the like. In one instance, the admixture further includes conductors (e.g., conductive carbon). The conductor(s) can be conductive additives, for example Super P (e.g., MTI), Super C65 (e.g., IMERY), Super C45 (e.g., IMERY), TIMREX KS6 (e.g., MTI), and KS6L (e.g., IMERY). Preferably, the admixture includes about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, or 10 wt. % of the conductor.

The process of preparing the material for use in an anode of a lithium ion battery can include thermalizing (at a temperature of about 600° C. to about 1200° C.; preferably to a temperature of about 750° C. to about 1100° C., or about 850° C. to about 1000° C.) an admixture of a plurality of silicon oxide nanoparticles, a carbon matrix precursor, and a catalyst or catalyst precursor, under a reducing atmosphere. This process, preferably, forms a plurality of particulates comprising a silicon-carbide reinforced carbon matrix carrying a plurality of silicon nanocrystals. Here, the reducing atmosphere can include hydrogen ($H_2$) and/or an admixture of carbon monoxide (CO) and carbon dioxide ($CO_2$). Preferably, the process includes providing the admixture of the plurality of silicon oxide nanoparticles, carbon matrix precursor, and catalyst or catalyst precursor, and includes reducing the silicon oxide to silicon metal during the thermalizing step; The process can further includes forming an active catalyst from the catalyst precursor, preferably, during the thermalizing step.

The admixture can include a mass ratio of the silicon oxide nanoparticles to the carbon matrix precursor of about 10:1 to about 1:10, about 10:1 to about 1:5, about 5:1 to about 1:5, about 4:1 to about 1:4, about 3:1 to about 1:3, or about 2.5:1 to about 1:2.5, alternatively the admixture can include a mass ratio of the silicon oxide nanoparticles to the carbon matrix precursor of about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. Alternatively, the admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the silicon oxide nanoparticles; can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the carbon matrix precursor; and can include about 0.01 wt. %, 0.02 wt. %, 0.025 wt. %, 0.03 wt. %, 0.035 wt. %, 0.040 wt. %, 0.045 wt. %, 0.050 wt. %, 0.055 wt. %, 0.060 wt. %, 0.065 wt. %, 0.070 wt. %, 0.075 wt. %, 0.080 wt. %, 0.085 wt. %, 0.090 wt. %, 0.095 wt. %, 0.1 wt. %, 0.2 wt. %, 0.25 wt. %, 0.3 wt. %, 0.35 wt. %, 0.40 wt. %, 0.45 wt. %, 0.50 wt. %, 0.55 wt. %, 0.6 wt. %, 0.65 wt. %, 0.7 wt. %, 0.75 wt. %, 0.8 wt.

%, 0.85 wt. %, 0.9 wt. %, 0.95 wt. %, 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. % of the catalyst or catalyst precursor.

In one instance, the admixture of the plurality of silicon oxide nanoparticles, carbon matrix precursor, and catalyst or catalyst precursor is free of or substantially free of silicon metal. In still another instance, the admixture can include a graphitic material. In yet another instance, the admixture can consist essentially of the plurality of silicon oxide nanoparticles, carbon matrix precursor, and catalyst or catalyst precursor, optionally with the graphitic material. The admixture can include about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 20 wt. %, 25 wt. %, 30 wt. %, 35 wt. %, 40 wt. %, 45 wt. %, or 50 wt. % of the graphitic material.

The silicon oxide nanoparticles preferably have mean diameter of less than about 1,000 nm, 500 nm, 400 nm, 350 nm, 300 nm, 250 nm, 200 nm, 150 nm, 100 nm, 75 nm, or 50 nm, and greater than about 1 nm, 5 nm, 10 nm, 15 nm, 20 nm, 25 nm, 30 nm, 35 nm, 40 nm, 45 nm, or 50 nm. Preferably, the silicon oxide nanoparticles have a $D_{90}$ of about 1,000 nm, 500 nm, 400 nm, 350 nm, 300 nm, 250 nm, 200 nm, 150 nm, 100 nm, 75 nm, or 50 nm; more preferably a $D_{50}$ of about 1,000 nm, 500 nm, 400 nm, 350 nm, 300 nm, 250 nm, 200 nm, 150 nm, 100 nm, 75 nm, or 50 nm. In one instance, the silicon oxide nanoparticles are spherical. In another instance, the silicon oxide nanoparticles have a plate-like morphology. The silicon oxide nanoparticles can be the product of, for example, hydrolytic nanoparticle grown form siloxanes; in another example, the silicon oxide nanoparticles can be the annealed product from a sol-gel process; in still another example, the silicon oxide nanoparticles can be a triturated silicon oxide (glass/quartz), where the triturated silicon oxide can be the result of, for example, ball milling or other physical process(es) known to reduce the size of silicon oxides to nanoparticles.

Still another embodiment is a process of preparing a material for use in an anode of a lithium ion battery where the process includes thermalizing an admixture of a plurality of silicon nanocrystals, a carbon matrix precursor, and a plurality of silicon carbide fibers. This process, preferably, forms a plurality of particulates comprising a silicon-carbide reinforced carbon matrix carrying a plurality of silicon nanocrystals. In one instance, the admixture consists essentially of a plurality of silicon nanocrystals, a carbon matrix precursor, and a plurality of silicon carbide fibers; in another instance, the admixture consists of a plurality of silicon nanocrystals, a carbon matrix precursor, and a plurality of silicon carbide fibers. The admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the silicon nanoparticles. The admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the carbon matrix precursor. The admixture can include about 10 wt. %, 15 wt. %, 20 wt. %, 25 wt. %, 30 wt. %, 35 wt. %, 40 wt. %, 45 wt. %, or 50 wt. % of the silicon carbide fibers. Herein, the admixture preferably includes silicon carbide fibers having a length of less than 1,000 nm, 900 nm, 800 nm, 700 nm, 600 nm, 500 nm, 400 nm, 300 nm, 200 nm, or 100 nm.

The materials described herein are useful in an electrode (e.g., an anode of a lithium-ion battery). In one instance, the anode includes a plurality of particulates having a diameter in the range of 100 nm to 50 µm. The particulates including a carbon matrix carrying a plurality of silicon nanocrystals and a plurality of SiC nanofibers. In one instance, the particulates consist essentially of the carbon matrix carrying the plurality of silicon nanocrystals and the plurality of SiC nanofibers. Herewith, the term consist essentially of means that the particulates do not include or include at a percentage below about 5 wt. %, 4 wt. %, 3 wt. %, 2 wt. %, or 1 wt. % a material that is active to lithiation during the cycling of a lithium-ion battery (i.e., a lithium-active material). In one example, the particulates can consist essentially of the carbon matrix carrying the plurality of silicon nanocrystals and the plurality of SiC nanofibers, yet still include a catalyst or spent catalyst. In still another instance, the particulates, consist of the carbon matrix carrying the plurality of silicon nanocrystals and the plurality of SiC nanofibers.

Another instance is an anode that includes a plurality of particulates, the particulates having a diameter in the range of about 50 nm to about 50 □m, and the particulates including a silicon-carbide reinforced carbon matrix carrying a plurality of silicon nanocrystals. Preferably, the anode includes a current collector carrying the plurality of particulates. In one instance, the current collector is a metal sheet or foil (e.g., copper or nickel). More preferably, the current collector carries an admixture of a binder and the plurality of particulates. In one example, the silicon-carbide reinforced carbon matrix includes a carbon-constituent material and SiC nanofibers. The silicon-carbide reinforced carbon matrix can further include interior SiC nanofiber segments and exterior SiC nanofiber segments; where the interior SiC nanofiber segments are carried within the carbon-constituent material and the exterior SiC nanofiber segments extend from a surface of the carbon-constituent material. Accordingly, the material can include a silicon-carbide reinforced binder is an admixture of the exterior SiC nanofiber segments and the binder. Still further, the admixture carried on the current collector can further includes a conductor (as described above).

Preferably, the anode has a specific capacity of about 1,000 to about 3,500 mAh/g, about 1,200 to about 3,500 mAh/g, about 1,400 to about 3,500 mAh/g, about 1,000 to about 3,000 mAh/g, about 1,000 to about 2,500 mAh/g, about 1,200 to about 2,500 mAh/g, or about 1,500 to about 2,500 mAh/g.

Aspects of the invention are further described in the following examples, which do not limit the scope of the invention as described in the claims.

EXAMPLES

Products were prepared using standard GLP procedures for handling of the respective materials and admixtures. All commercial materials were used as received.

Figure 3:
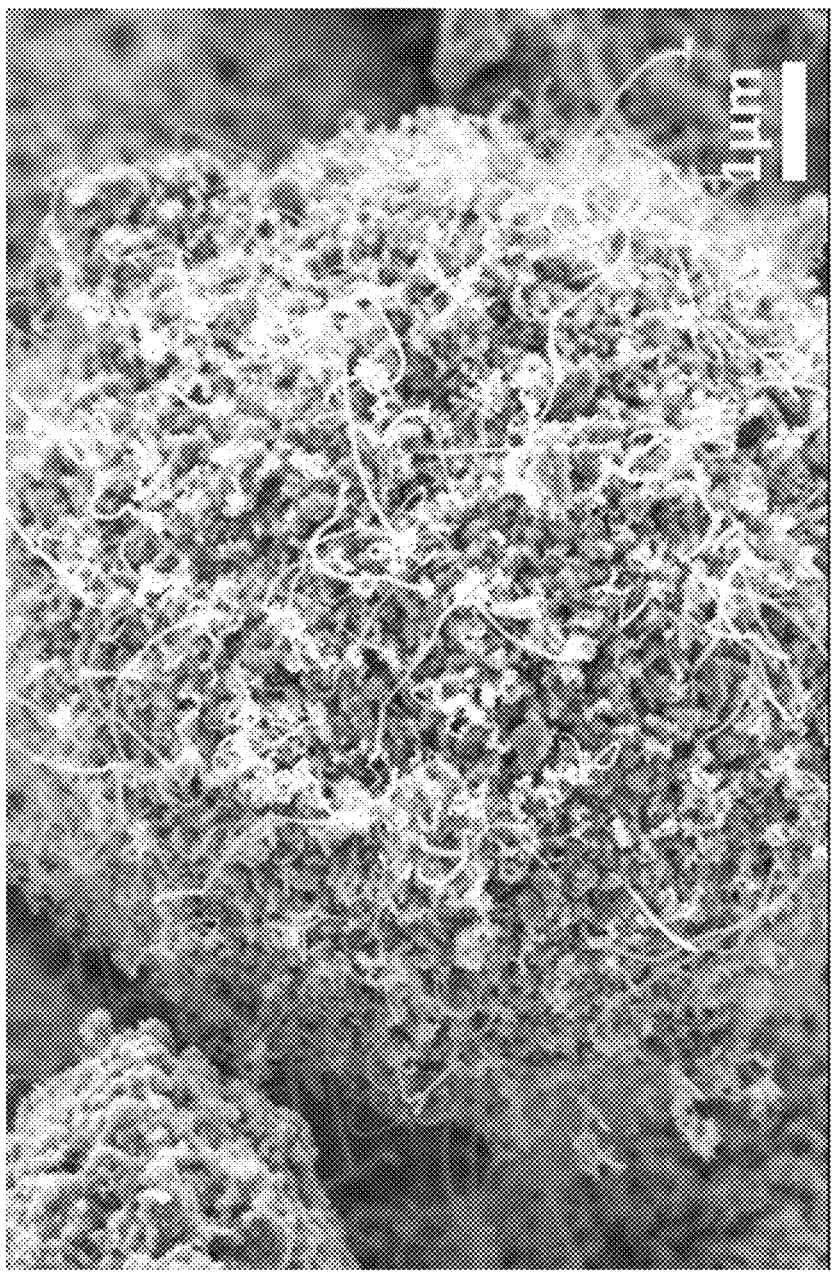
FIG. 3 is an SEM image of the material prepared pursuant to Example 1.

Example 1 (High Fiber): an admixture of about 52 wt. % silicon nanocrystals, about 7 wt. % conductive carbon, about 7 wt. % nickel nitrate hexahydrate, and about 33 wt. % phenolic resin in ethanol was spray dried to give micron sized particulates that include an admixture of a plurality of silicon nanocrystals, a carbon matrix precursor, and a catalyst or catalyst precursor. The particulates were then thermalized under an argon/hydrogen atmosphere at 1000° C. An SEM image of the product is shown in FIG. 3.

Figure 4:
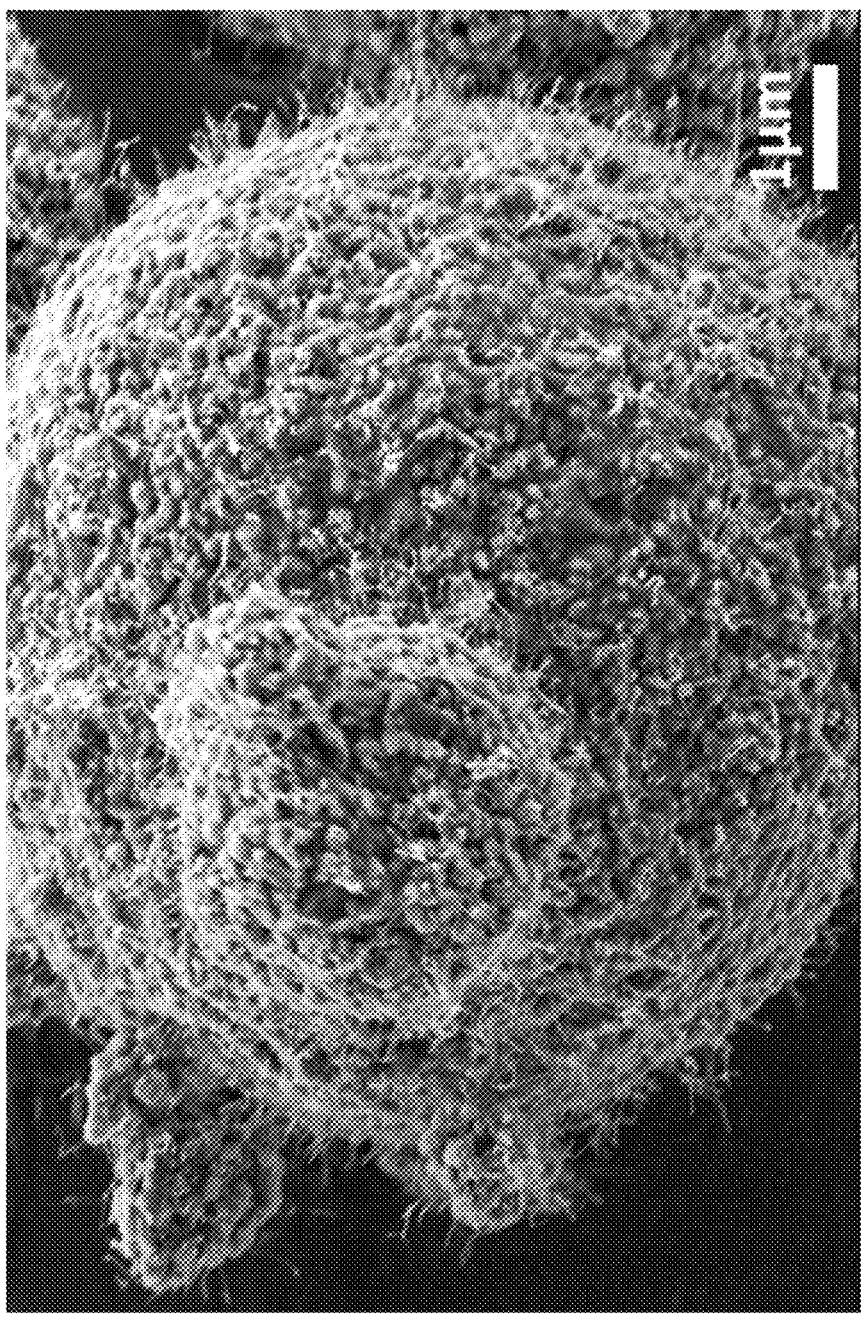
FIG. 4 is an SEM image of the material prepared pursuant to Example 2.

Example 2 (Mid Fiber): an admixture of about 46 wt. % silicon nanocrystals, about 2 wt. % conductive carbon, about 8.2 wt. % nickel acetate tetrahydrate, about 12 wt. % copper acetate monohydrate, about 16 wt. % phenolic resin, and about 15 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized argon/hydrogen atmosphere at 1000° C. An SEM image of the product is shown in FIG. 4.

Figure 5:
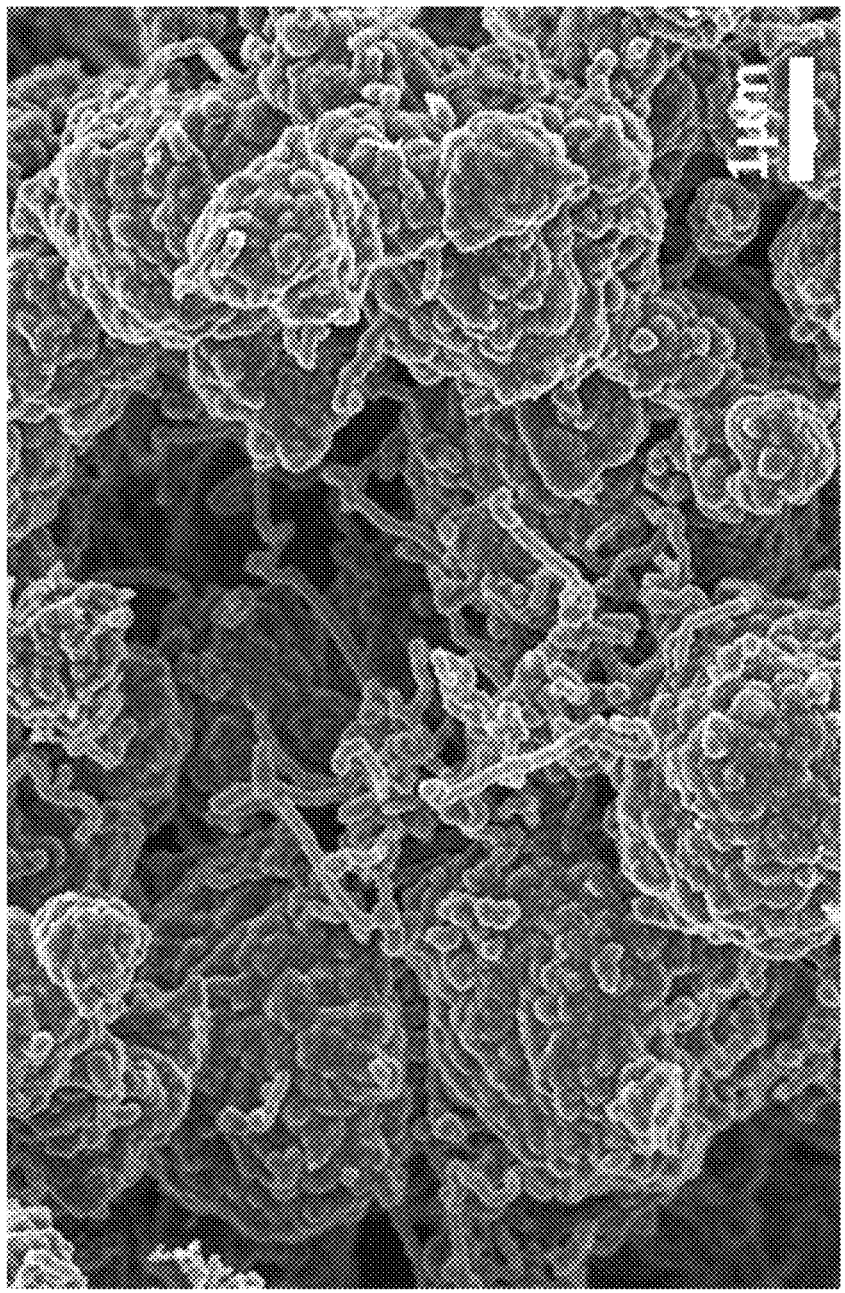
FIG. 5 is an SEM image of the material prepared pursuant to Example 3.

Example 3 (Mid Fiber-C): was identical to Example 2 but the particulates heated under an argon/hydrogen atmosphere to 1000° C. and were then held at temperature under a flow of argon/methane/carbon dioxide for 3 h. An SEM image of the product is shown in FIG. 5.

Figure 6:
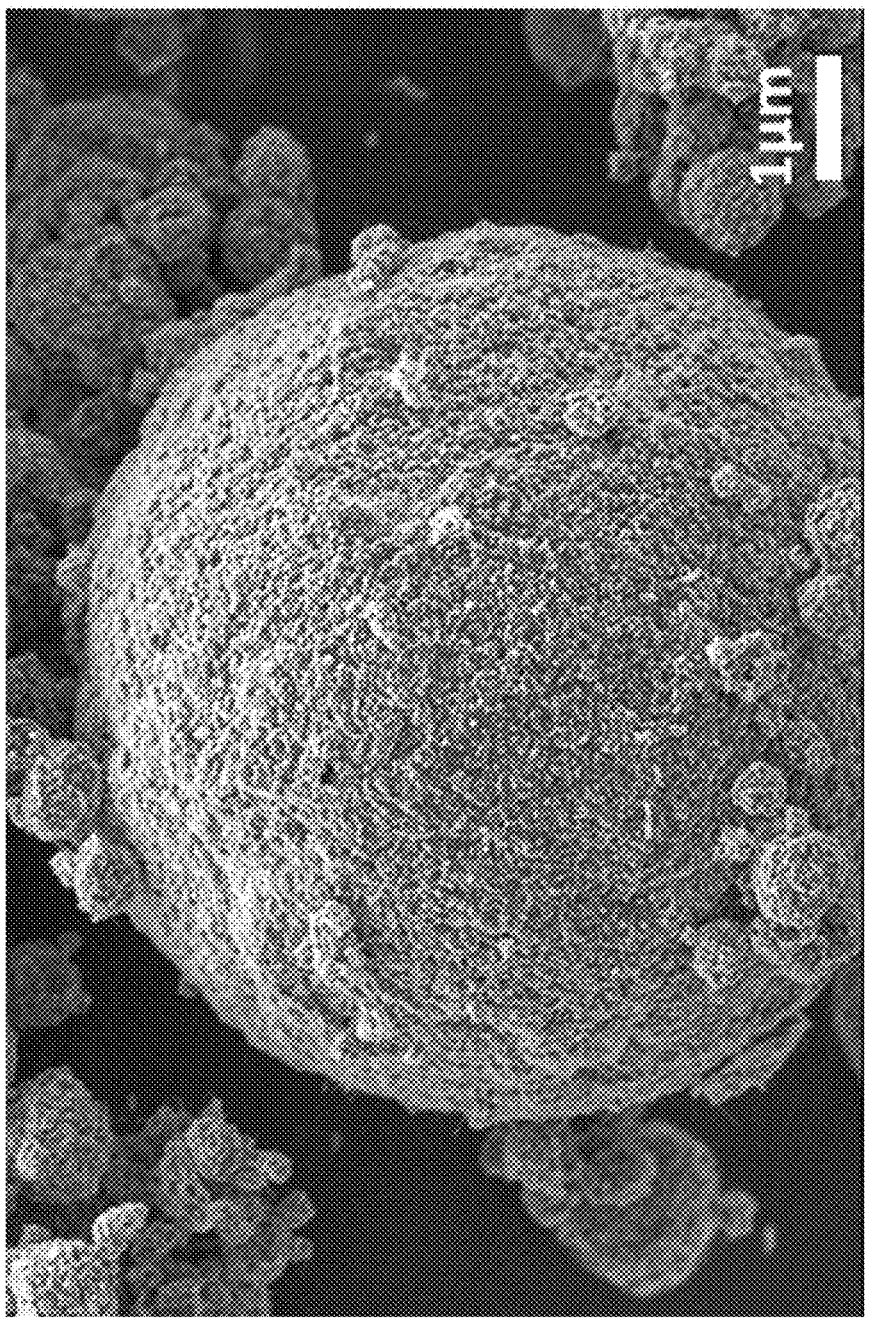
FIG. 6 is an SEM image of the material prepared pursuant to Example 4.
Figure 7:
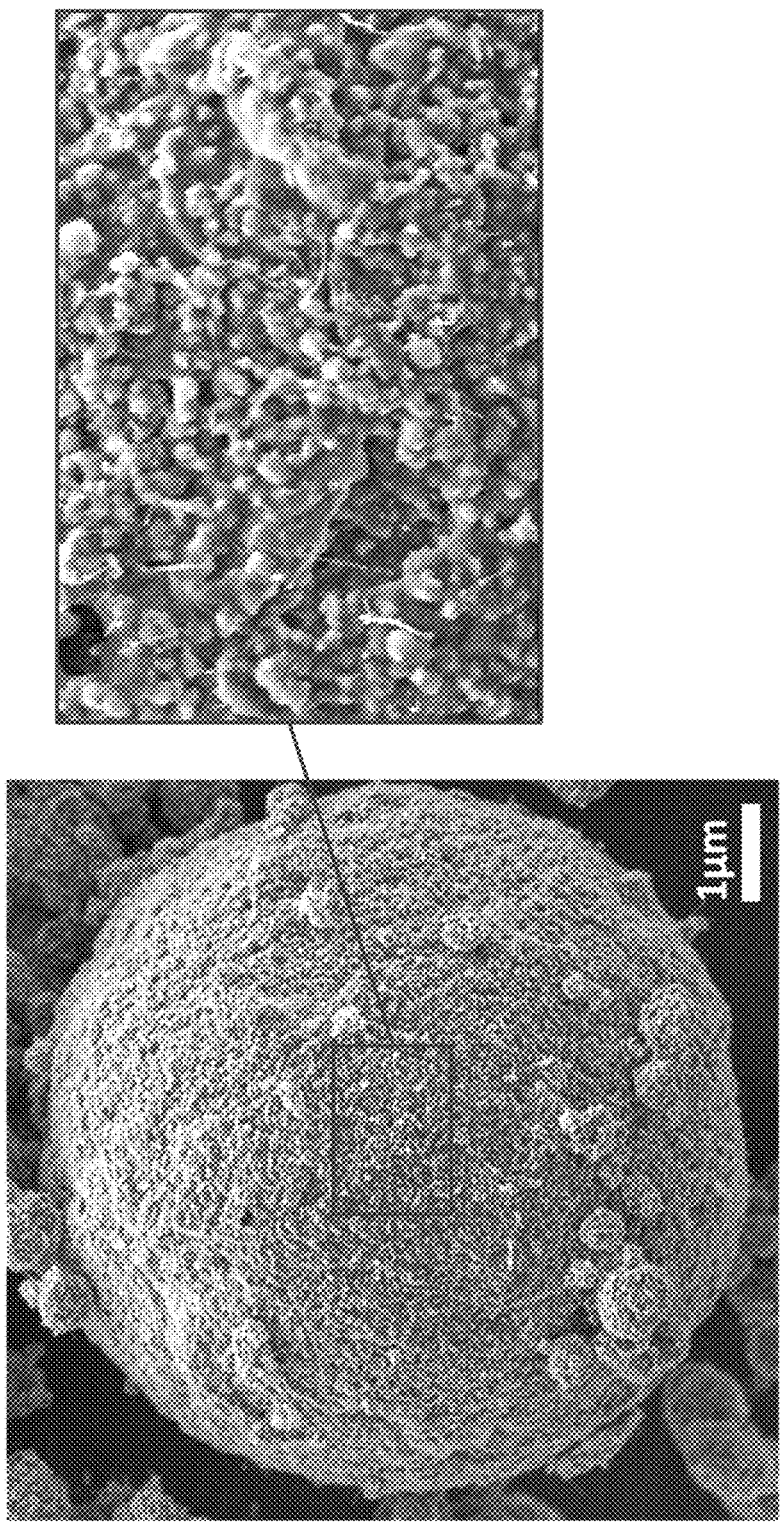
FIG. 7 is depicts an expanded view of a section of the material shown in FIG. 6.

Example 4 (Low Fiber): an admixture of about 50 wt. % silicon nanocrystals, about 2 wt. % conductive carbon, about 8 wt. % nickel acetate tetrahydrate, about 12 wt. % copper acetate monohydrate, about 16 wt. % phenolic resin, and about 12 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized an argon/hydrogen atmosphere at 850° C. An SEM image of the product is shown in FIG. 6 and an expanded view of the product is shown in FIG. 7.

Example 5: an admixture of about 56 wt. % silicon nanocrystals, about 2 wt. % conductive carbon, about 5 wt. % nickel acetate tetrahydrate, about 8 wt. % copper acetate monohydrate, about 17 wt. % phenolic resin, and about 12 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized an argon/hydrogen atmosphere at 850° C.

Example 6: an admixture of about 65 wt. % silicon nanocrystals, about 2 wt. % conductive carbon, about 0.4 wt. % nickel acetate tetrahydrate, about 0.6 wt. % copper acetate monohydrate, about 18 wt. % phenolic resin, and about 14 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized an argon/hydrogen atmosphere at 850° C.

Figure 8:
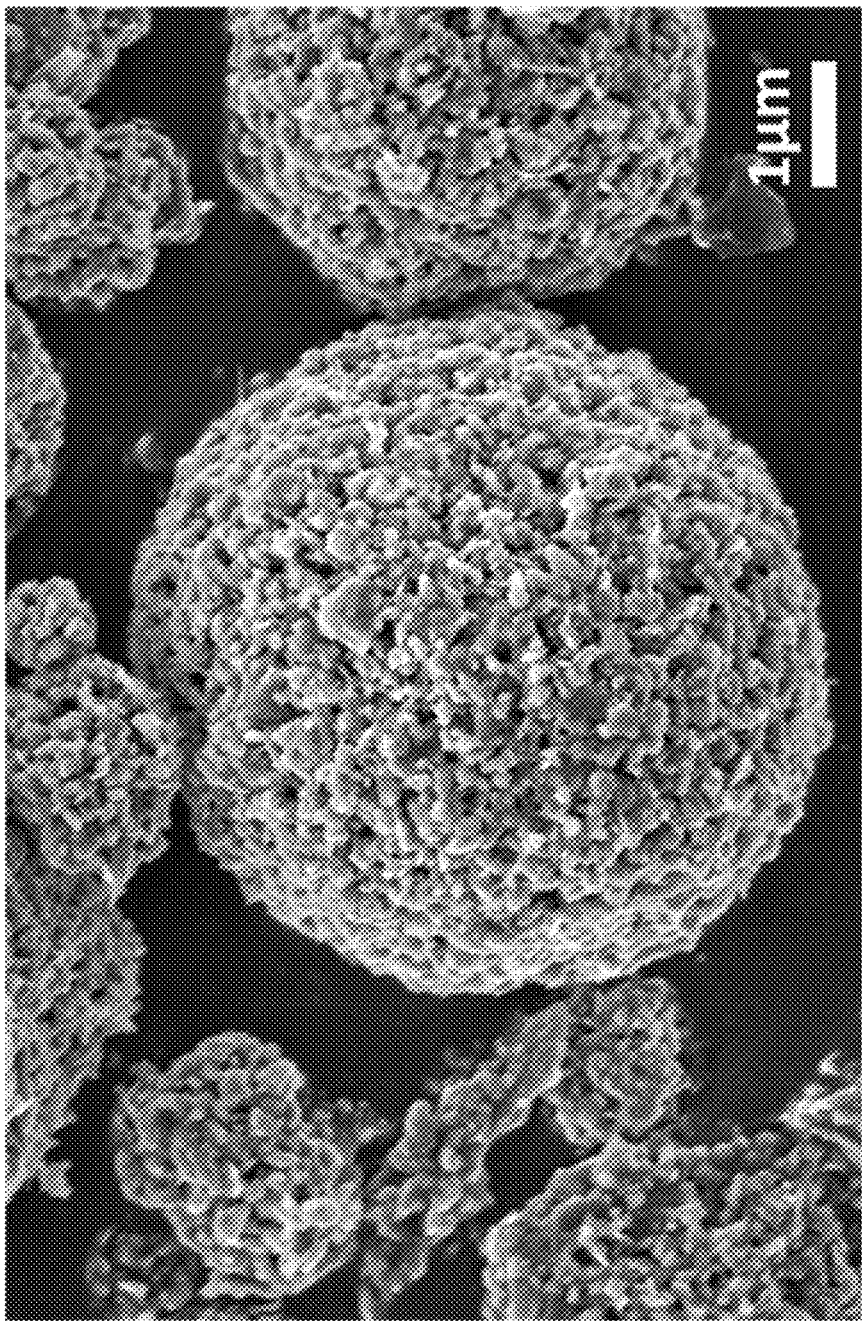
FIG. 8 is an SEM image of the Comparative Example.

Comparative Example (No Fiber): an admixture of about 65 wt. % silicon nanocrystals, about 2.5 wt. % conductive carbon, about 19 wt. % phenolic resin, and about 14 wt. % pitch in an admixture of NMP and ethanol was spray dried to give micron sized particulates that include an admixture of a plurality of silicon nanocrystals, a carbon matrix precursor. The particulates were then thermalized under an argon/hydrogen atmosphere at 1000° C. An SEM image of the product is shown in FIG. 8.

Electrochemical Cells

Figure 9:
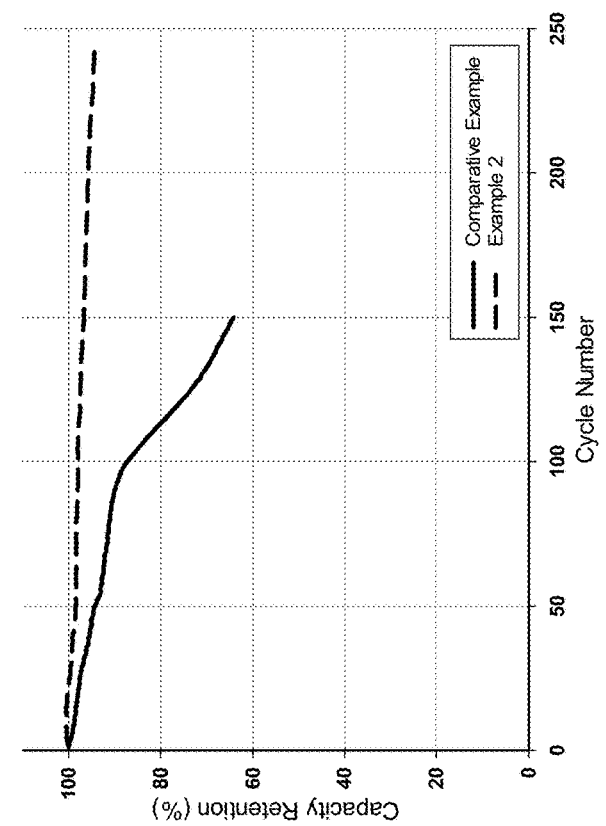
FIG. 9 is plots of Specific Capacity and Capacity Retention vs Cycle Number for 15% Cells using the materials prepared pursuant to Example 2 vs the Comparative Example.
Figure 9:
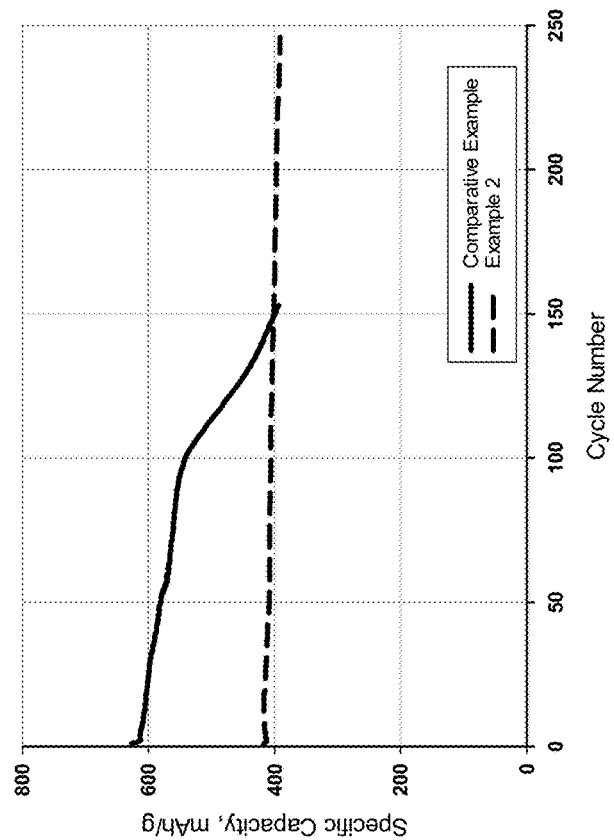

15% Cells were prepared by admixing 15 wt. % of a particulate (e.g., Examples 1-6 and comparative example) with 70 wt. % graphite, 5 wt. % conductive carbon, and 10 wt. % of a binder. Half-cells were assembled and tested under standard protocol. Examples of results from 15% Cells are shown in FIG. 9.

Figure 10:
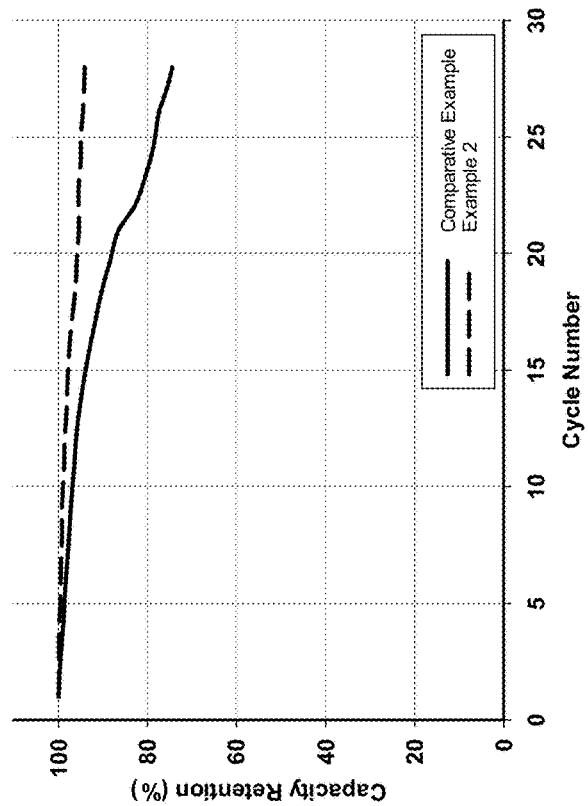
FIG. 10 is plots of Specific Capacity and Capacity Retention vs Cycle Number for Graphite-Free Cells using the materials prepared pursuant to Example 2 vs the Comparative Example.
Figure 10:
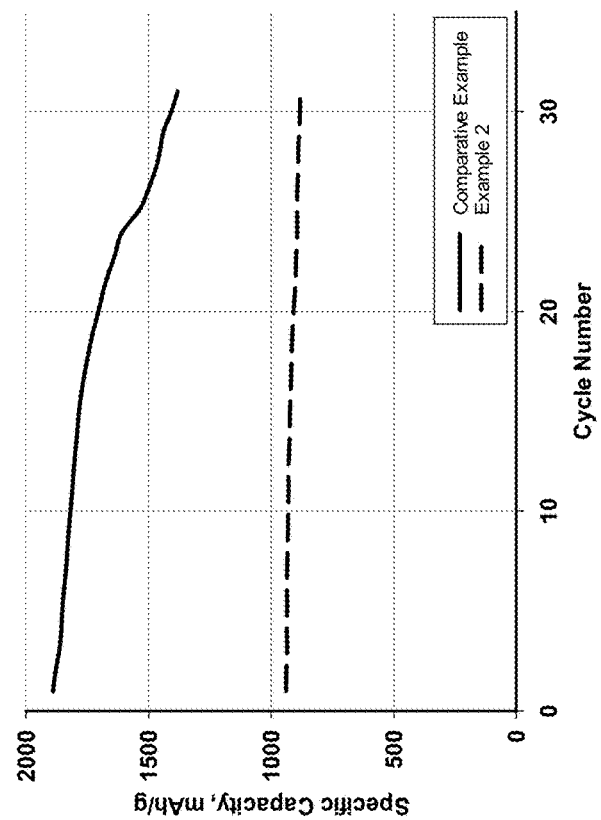
Figure 11:
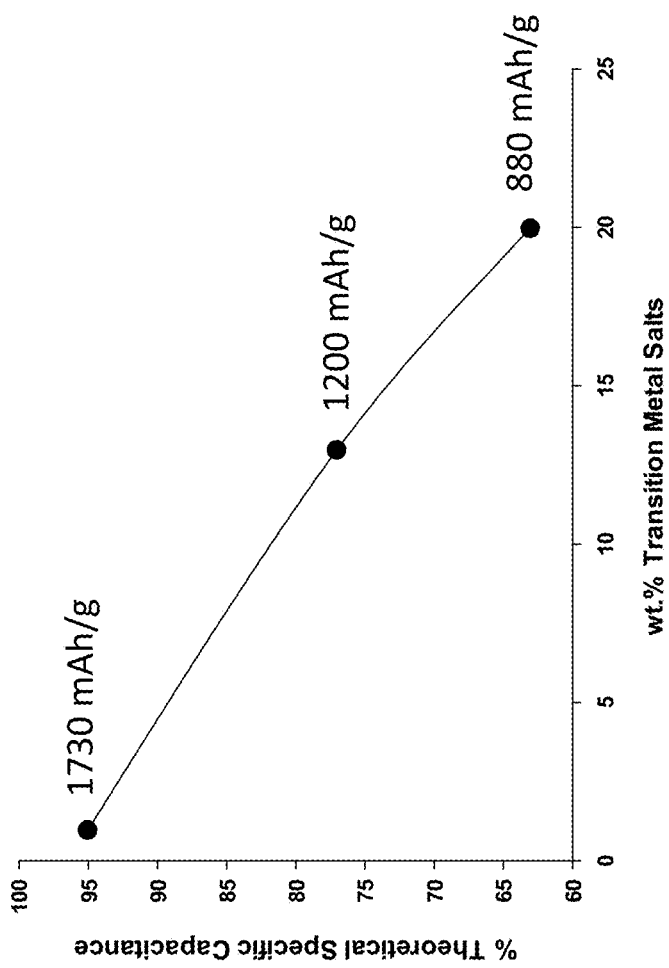
FIG. 11 is a plot of theoretical specific capacitance for Graphite-Free Cells assembled from the materials in Examples 4, 5, and 6, wherein the % theoretical specific capacitance is determined based on an idealized Graphite-Free Cell ((Measured SC/idealized SC)*100) plotted against the weight percentage of the transition metal salts admixed into a composition that is then thermalized pursuant to the descriptions herein.

Graphite-Free Cells were prepared by admixing 70 wt. % of a particulate (e.g., Examples 1-6 and comparative example) with 15 wt. % conductive carbon, and 15 wt. % of a binder. Half-cells were assembled and tested under standard protocol. Examples of results from Graphite-Fee Cells are shown in FIG. 10. FIG. 11 shows the percent theoretical specific capacitance for the products of Examples 4-6 in Graphite-Free Cells vs the wt. % of the transition metal salts provided in the Examples.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A process of preparing a material for use in an anode of a lithium ion battery, the process comprising:
    thermalizing an admixture of a plurality of silicon nanocrystals, a carbon matrix precursor, and a catalyst or catalyst precursor;
    wherein thermalizing the admixture includes forming SIC nanofibers.

2. The process of claim 1, wherein thermalizing the admixture includes forming particulates that comprise a silicon-carbide reinforced carbon matrix carrying a plurality of silicon nanocrystals.

3. The process of claim 2, wherein the silicon-carbide reinforced carbon matrix includes a carbon-constituent material and SIC nanofibers; wherein the silicon-carbide reinforced carbon matrix includes SIC nanofibers carried within the carbon-constituent material and includes SIC nanofibers extending from a surface of the carbon-constituent material.

4. The process of claim 1, wherein the catalyst or catalyst precursor includes nickel, copper, iron, zinc, or a mixture thereof.

5. The process of claim 1, wherein the admixture comprises a plurality of spherical particulates each including silicon nanocrystals, carbon matrix precursor, and catalyst or catalyst precursor;
    the process further comprising forming the plurality of spherical particulates by a biphasic technique.

6. The process of claim 1, wherein thermalizing the admixture includes increasing a temperature about the admixture to about 600° C. to about 1200° C. for about 0.5 to about 5 hours.

7. The process of claim 1, wherein the admixture is thermalized under a reducing atmosphere.

8. The process of claim 1, wherein the admixture further includes a graphitic material.

9. The process of claim 1, wherein the admixture further includes silicon oxide.

10. The process of claim 1, wherein the admixture is substantially free of silicon oxides.

11. The process of claim 10, wherein the admixture further includes an oxy-graphitic material; wherein the oxy-graphitic material includes a graphitic material carrying aldehyde and carboxylate groups on the edges of graphic sheets or tubes.

12. A process of preparing a material for use in an anode of a lithium ion battery, the process comprising:
    thermalizing an admixture of a plurality of silicon oxide nanoparticles, a carbon matrix precursor, and a catalyst or catalyst precursor under a reducing atmosphere at a temperature of about 600° C. to about 1200° C.; and thereby forming a plurality of particulates comprising a silicon-carbide reinforced carbon matrix carrying a plurality of silicon nanocrystals.

13. A process of preparing a material for use in an anode of a lithium ion battery, the process comprising:

thermalizing an admixture of a plurality of silicon nanocrystals, a carbon matrix precursor, and a plurality of silicon carbide fibers; and thereby forming a plurality of particulates comprising a silicon-carbide reinforced carbon matrix carrying a plurality of silicon nanocrystals.

* * * * *